United States Patent
Ishii

(10) Patent No.: US 8,040,107 B2
(45) Date of Patent: Oct. 18, 2011

(54) BATTERY CHARGER, SECONDARY BATTERY UNIT AND ELECTRIC APPARATUS EQUIPPED THEREWITH

(75) Inventor: Jun Ishii, Hamamatsu (JP)

(73) Assignee: Yamaha Corporation, Shizuoka-Ken (JP)

( * ) Notice: Subject to any disclaimer, the term of this patent is extended or adjusted under 35 U.S.C. 154(b) by 771 days.

(21) Appl. No.: 12/168,806

(22) Filed: Jul. 7, 2008

(65) Prior Publication Data

US 2009/0033276 A1 Feb. 5, 2009

(30) Foreign Application Priority Data

Jul. 31, 2007 (JP) .................... 2007-199571

(51) Int. Cl.
*H01M 10/46* (2006.01)
(52) U.S. Cl. ...................................... 320/132
(58) Field of Classification Search .............. 320/107, 320/128, 132, 149; 702/63, 64, 65; 324/426, 324/427, 430, 433
See application file for complete search history.

(56) References Cited

U.S. PATENT DOCUMENTS 6,243,741 B1 * 6/2001 Utsumi .................. 709/208
2005/0156571 A1 7/2005 Inui et al.

FOREIGN PATENT DOCUMENTS

| CN | 1638228 A | 7/2005 |
| JP | 2005-117726 | 4/2005 |

* cited by examiner

*Primary Examiner* — Edward Tso
(74) *Attorney, Agent, or Firm* — Harness, Dickey & Pierce, PLC

(57) ABSTRACT

A mobile telephone has a rechargeable battery, and the rechargeable battery is charged through a battery charger; the battery charger includes an information processing system serving as a charge controller and a battery manager; the battery manager measures a discharging time period of the rechargeable battery so as to store pieces of duration data expressing a charge-and-discharge cycle, and determines a charge initiation level and a charge completion level on the basis of the pieces of duration data in such a manner to reduce the number of charging operation without shortage of electric charge for the rechargeable battery; and the charge controller carries out the charging with reference to the charge initiation level and charge completion level so that the rechargeable battery is prolonged in life time.

20 Claims, 7 Drawing Sheets

BATTERY CHARGER, SECONDARY BATTERY UNIT AND ELECTRIC APPARATUS EQUIPPED THEREWITH

FIELD OF THE INVENTION

This invention relates to a battery charger and, more particularly, to a battery charger for secondary cells, a secondary battery unit and an electric apparatus equipped with the secondary battery unit.

DESCRIPTION OF THE RELATED ART

The secondary cells are a source of voltage rechargeable through a reversible chemical action, and are found in various sorts of electric appliances and electronic appliances such as, for example, PDA (Personal Digital Assistants), notebook-sized personal computers and mobile telephones. In the following description, both of the electric appliances and electronic appliances are simply referred to as "electronic appliances". Lithium-ion cells and Ni-MH (Nickel Metal Hydride) cells are examples of the secondary cells. The secondary cells exhibit their ability on the condition that they are charged to the maximum capacity. When the secondary cells are connected to a source of electric power, the charge is initiated for the secondary cells. The charge is to be terminated at the perfectly charged state as taught in Japan Patent Application laid-open No. 2005-117726.

As well known, the overcharge makes the secondary cells seriously deteriorated, and shortened the duration time. In order to prevent the secondary cells from the overcharge, various control techniques have been proposed for the charge-and-discharge on the secondary cells. One of the control techniques is disclosed in Japan Patent Application laid-open No. Hei 10-66277. The prior art control technique disclosed in the Japan Patent Application laid-open is featured by the automatic termination of charging operation on the secondary cells through the comparison between the current potential level of secondary cells and the prescribed potential level. In the Japan Patent Application laid-open, the duration time of secondary cells is defined as the number of charging operations until the secondary cells do not exhibit certain charging-and-discharging characteristics. The term "duration time" is used in the meaning same as the definition in the Japan Patent Application laid-open. On the other hand, term "service time" means the lapse of time from the first usage to the deterioration of charging-and-discharging characteristics.

The secondary cells in electronic devices are, by way of example, recharged through chargers called as cradles. Users put their electronic appliances on the cradles for recharging, and the cradles further serve as holders for the electronic appliances. When the user wishes to use the electronic appliance, he or she picks up the electronic appliance on the cradle. Then, the secondary cells in the electronic appliance are disconnected from the cradle, and the charging is interrupted at the separation from the cradle. When the user finishes something to do by means of the electronic appliance, he or she puts the electronic appliance on the cradle, again. Then, the cradle starts the recharging regardless of the residual quantity of electric charge in the secondary cells.

If a user frequently repeats the short usage of electronic appliance, the secondary cells are discharged a little, and are immediately recharged to or over the maximum capacity. The shallow discharging, in which the secondary cells are discharged a little, and the immediate recharging are causative of damage on the secondary cells, and the duration time is liable to be shortened due to the frequent repetition of shallow discharging and immediate recharging.

There have been proposed various countermeasures for problems of secondary cells. For example, it is proposed that the charging is terminated at imperfectly charged state so as to prevent the secondary cells from excess charge. The countermeasure is effective against the reduction in duration time due to the excess charge. However, the frequent repetition of shallow discharging and immediate recharging is not taken into account. As a result, the secondary battery still suffers from the problems of the repetition of charging and discharging.

On the other hand, if electronic appliances are prohibited from recharging operation until most of electric charge is discharged, there is serious possibility to make the second cells empty during the use of electronic appliance. Thus, there is a trade-of between the shallow discharge and the deep discharge, in which most of electric charge is discharged.

SUMMARY OF THE INVENTION

It is therefore an important object of the present invention to provide a battery charger, which makes secondary cells durable through reduction in the number of charging operation without shortage of electric charge.

It is another important object of the present invention to provide a secondary battery unit, which has the battery charger.

It is also important object of the present invention to provide an electric apparatus, which has the secondary battery unit.

To accomplish the object, the present invention proposes to control charging operations on the basis of tendency of actual use of an electronic appliance.

In accordance with one aspect of the present invention, there is provided a battery charger for a rechargeable battery comprising a battery managing unit including a data collector monitoring the rechargeable battery to see whether or not the rechargeable battery is discharged and producing pieces of historical data expressing use of the rechargeable battery and an analyzer connected to the data collector and determining a tendency of the use on the basis of the pieces of historical data so as preliminarily to determine state of the rechargeable battery to be charged, a charging unit electrically connectable to the rechargeable battery and charging the rechargeable battery, and a charge controlling unit including a determiner connected to the analyzer and the rechargeable battery and monitoring the rechargeable battery to see whether or not the rechargeable battery enters the state and a commander connected to the determiner and the charging unit and instructing the charging unit to charge the rechargeable battery while the rechargeable battery is staying in the state.

In accordance with another aspect of the present invention, there is provided a secondary battery unit for supplying electric power to an apparatus comprising a rechargeable battery connectable to the apparatus, and a battery charger including a battery managing unit having a data collector monitoring the rechargeable battery to see whether or not the rechargeable battery is discharged and producing pieces of historical data expressing use of the rechargeable battery and an analyzer connected to the data collector and determining a tendency of the use on the basis of the pieces of historical data so as preliminarily to determine state of the rechargeable battery to be charged, a charging unit electrically connected to the rechargeable battery and charging the rechargeable battery and a charge controlling unit having a determiner connected to the analyzer and the rechargeable battery and monitoring the rechargeable battery to see whether or not the rechargeable battery enters the state and a commander connected to the determiner and the charging unit and instructing the charging unit to charge the rechargeable battery while the rechargeable battery is staying in the state.

In accordance with yet another aspect of the present invention, there is provided an electric apparatus carrying out a work comprising an electric system accomplishing the work, a rechargeable battery connected to the electric system, and a battery charger including a battery managing unit having a data collector monitoring the rechargeable battery to see whether or not the rechargeable battery is discharged and producing pieces of historical data expressing use of the rechargeable battery and an analyzer connected to the data collector and determining a tendency of the use on the basis of the pieces of historical data so as preliminarily to determine state of the rechargeable battery to be charged, a charging unit electrically connected to the rechargeable battery and charging the rechargeable battery and a charge controlling unit having determiner connected to the analyzer and the rechargeable battery and monitoring the rechargeable battery to see whether or not the rechargeable battery enters the state and a commander connected to the determiner and the charging unit and instructing the charging unit to charge the rechargeable battery while the rechargeable battery is staying in the state.

In accordance with still another aspect of the present invention, there is provided a method for managing a rechargeable battery comprising the steps of a) gathering pieces of historical data each expressing an actual use of the rechargeable battery, b) determining a tendency of the use so as preliminarily to determine state of the rechargeable battery to be charged on the basis of the pieces of historical data, c) monitoring the rechargeable battery to see whether or not the rechargeable battery enters the state, d) repeating the step c) when the rechargeable battery is out of the state, e) starting the charging operation on the rechargeable battery without any execution of the step d) when the rechargeable battery is found in the state, f) monitoring the rechargeable battery to see whether or not the rechargeable battery exits from the state, g) repeating the step f) when the rechargeable battery is still found in the state, and h) stopping the charging operation when the rechargeable battery exits from the state.

BRIEF DESCRIPTION OF THE DRAWINGS

The features and advantages of the battery charger, secondary battery unit and electric apparatus will be more clearly understood from the following description taken in conjunction with the accompanying drawings, in which.

DESCRIPTION OF THE PREFERRED EMBODIMENTS

An electric apparatus embodying the present invention carries out a work with electric power, and largely comprises an electric system, a rechargeable battery and a battery charger. The rechargeable battery is connected to the electric system so as to supply the electric power to the electric system. The battery charger is also powered through the rechargeable battery. While the electric power is being supplied to the electric system, the electric system accomplishes the work.

The battery charger includes a battery managing unit, a charging unit and a charge controlling unit. The battery managing unit is connected to the rechargeable battery and the charge controlling unit, and the charge controlling unit is further connected to the charging unit and rechargeable battery. The battery manager determines state of the rechargeable battery to be charged, and the charge controlling unit checks the rechargeable battery to see whether or not the rechargeable battery is to be charged. If the answer is given affirmative, the rechargeable battery is charged through the charging unit under the supervision of the charge controlling unit. The state of rechargeable battery to be charged is individually determined on the basis of actual history of use so that the charging operation is restricted without shortage of electric power of the rechargeable battery.

In more detail, the battery manager has a data collector and an analyzer. The data collector monitors the rechargeable battery to see whether or not the rechargeable battery is discharged, and produces pieces of historical data expressing use of the rechargeable battery. The analyzer is connected to the data collector, and determines a tendency of the use so as preliminarily to determine the state of rechargeable battery to be charged. Thus, the battery manager determines the state of rechargeable battery to be charged on the basis of the history.

The charge controlling unit has a determiner and a commander. The determiner is connected to the analyzer and the rechargeable battery, and monitors the rechargeable battery to see whether or not the rechargeable battery enters the state. The commander is connected to the determiner and the charging unit, and instructs the charge controlling unit to charge the rechargeable battery while the rechargeable battery is staying in the state.

As will be appreciated from the foregoing description, the state of rechargeable battery is individually determined on the basis of the actual history of use. The battery charger prevents the rechargeable battery from the shallow discharge. Neither unnecessary charging operation nor shortage of electric charge takes place in the rechargeable battery.

First Embodiment

System Configuration of Electronic Appliance

Figure 1:
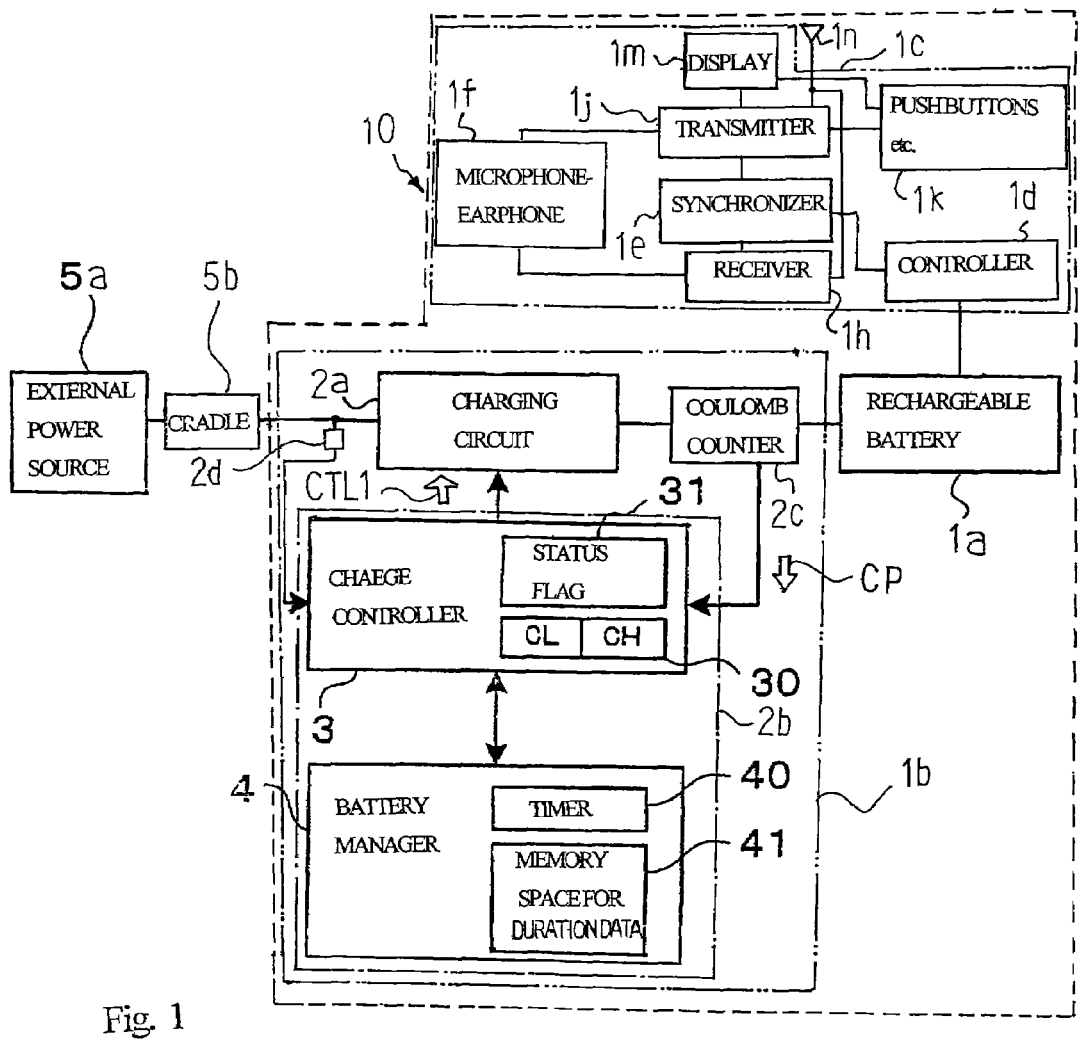
FIG. 1 is a block diagram showing the system configuration of a mobile telephone of the present invention.

Referring first to FIG. 1 of the drawings, a mobile telephone 10 embodying the present invention largely comprises a rechargeable battery 1a, a battery charger 1b and a radio communication system 1c. The battery charger 1b is connected to the rechargeable battery 1a for charging the rechargeable battery 1a, and the rechargeable battery 1a is connected to the radio communication system 1c so as to supply electric power to the radio communication system 1c.

The battery charger 1b is connectable with an external power source 5a such as, for example, an ac-to-dc converter connected to a plug socket. A cradle 5b is provided between the external power source 5a and the battery charger 1b. While the mobile telephone 10 is standing idle, the mobile telephone 10 is put on the cradle 5b, and the electric power is relayed from the external power source 5a through the cradle 5b to the battery charger 1b. On the other hand, when a user picks up the mobile telephone 10 on the cradle 5b, the battery charger 1b is disconnected from the external power source 5a. Thus, there is a possibility frequently to repeat the charging and discharging.

The rechargeable battery 1a includes plural secondary cells. In this instance, lithium-ion cells are used in the rechargeable battery 1a. Since the lithium-ion cells are well known to those skilled in the art, no further description is hereinafter incorporated for the sake of simplicity.

The battery charger 1b includes a charging circuit 2a, an information processing system 2b and a coulomb counter 2c, and the information processing system 2b is connected to the charging circuit 2a and coulomb counter 2c. A computer program runs on a microprocessor of the information processing system 2b, and plural functions such as a charge controller 3 and a battery manager 4 are realized through execution of instruction codes in the computer program stored in a program memory of the information processing system 2b. The information processing system 2b further includes a working memory, which is, by way of example, implemented by a random access memory device and a non-volatile memory such as, for example, an electrically erasable and programmable memory device. Certain memory locations of the working memory are assigned to flags, a software timer, pieces of duration data and pieces of critical data.

The coulomb counter 2c measures the electric current, which flows from the charging circuit 2a to the rechargeable battery 1a, and estimates the amount of electric charge stored in the rechargeable battery 1a. A piece of charge data CP expresses the amount of electric charge, and is reported from the coulomb counter 2c to the information processing system 2b.

The battery manager 4 cooperates with the charge controller 3 so as to keep the amount of electric charge of the rechargeable battery 1a in a target range. The battery manager 4 and charge controller 3 monitor the rechargeable battery 1a, and determine the initiation of charging and the completion of charging on the basis of the duration data of the rechargeable battery 1a. The charge controller 3 is connected to the charging circuit 2, and activates and deactivates the charging circuit 2 under the control of the battery manager 4. While the charging circuit 2 is being active, the rechargeable battery 1a is charged by the charging circuit 2. When the charge controller 3 deactivates the charging circuit 2, the charging circuit 2 does not charge the rechargeable battery 1a any more. While the radio communication system 1c is being powered, the electric power is consumed in the radio communication system 1c, and the rechargeable battery 1a is discharged. Thus, the rechargeable battery 1a is repeatedly subjected to the charging and discharging. In other words, the discharge-and-charge cycle is repeated in the rechargeable battery 1a. The charge controller 3 and battery manager 4 are hereinlater described in more detail.

The radio communication system 1c includes a controller 1d, a synchronizer 1e, a microphone-and-earphone unit 1f, a receiver 1h, a transmitter 1j, an array of pushbuttons 1k, a display 1m and an antenna 1n. A user inputs a subscriber's code assigned to someone through the array of pushbuttons 1k, and the subscriber's code is visualized on the display 1m.

When a radio channel is established between the mobile telephone 10 and another telephone (not shown), the user talks with someone through the microphone of the unit 1f, and user's voice is converted to an electric signal through the microphone. The electric signal is transmitted from the transmitter 1j though the antenna 1n under the control of controller 1d and synchronizer 1e. When radio waves reaches the antenna 1n, the electric signal is supplied from the antenna 1n through the receiver 1h to the earphone of the unit 1f under the control of controller 1d and synchronizer 1e, and is converted to voice. Thus, the radio communication system 1c behaves as those well known to those skilled in the art.

Description is hereinafter made on the two functions, i.e., the charge controller 3 and battery manager 4. Following flag and critical data relate to the charge controller 3. The flag is called as a "status flag" 31, and the status flag 31 is indicative of whether the charging circuit 2a is connected to or disconnected from the external power source 5a. A piece of the critical data expresses the smallest amount of electric charge CL stored in the rechargeable battery 1a, and another piece of the critical data expresses the largest amount of electric charge CH stored in the rechargeable battery 1a. The memory location 30 is assigned to the pieces of critical data, which are also labeled with "CL" and "CH" in the following description.

The charge controller 3 compares the piece of charge data CP with the pieces of critical data CL and CH to see whether the charging circuit 2a initiates the charging or completes the charging. When the amount of electric charge stored in the rechargeable battery 1a is reduced to the smallest amount of electric charge, the charge controller 3 supplies a control signal CTL1 representative of the initiation of charging operation, and activates the charging circuit 2a so as to charge the rechargeable battery 1a. On the other hand, when the amount of electric charge already stored in the rechargeable battery 1a reaches the largest amount of electric charge, the charge controller 3 supplies the control signal CTL1 representative of the termination of charging operation, and deactivates the charging circuit 2a.

A voltmeter 2d reports the potential level at the interface between the cradle 5b and the charging circuit 2a to the information processing system 2b. When the potential level is greater than a threshold, the charge controller 3 raises the status flag 31 indicative of the connection between the cradle 5b and the charging circuit 2a. On the other hand, if the potential level is equal to or less than the threshold, the charge controller 3 takes the flag 31 down, and the flag 31 expresses the disconnection from the external power source 5a. The battery manager 4 periodically accesses the status flag 31 as will be hereinafter described.

Figure 2:
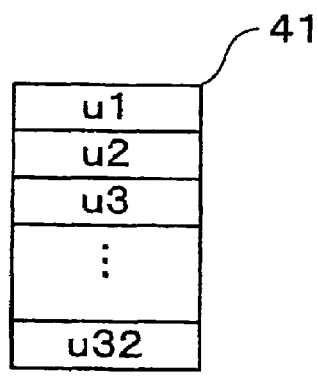
FIG. 2 is a view showing memory locations assigned to pieces of duration data.

A memory location of the working memory is assigned to the software timer 40, and pieces of duration data are stored in other memory locations 41 of the working memory. In this instance, thirty-two memory locations 41 are prepared for the pieces of duration data. When the rechargeable battery 1a is disconnected from the external power source 5a, the battery manager 4 makes the software timer start to measure a lapse of time. The battery manager 4 makes the software timer 40 stop at the resumption of charging. Concurrently, the battery manager 4 stores the lapse of time as a piece of duration data, and the pieces of duration data u1, u2, u3, . . . and u32 are successively written in the memory locations 41 as shown in FIG. 2. In the following description, values of the pieces of duration data u1, u2, u3, . . . and u32 are also labeled with u1, u2, u3, . . . and u32. The values u1, u2, u3, . . . and u32 are expressed as the ratio of time period, which is measured by means of the software timer 40, to the maximum operating time period of rechargeable battery 1a. The maximum operating time period is from the charging rate of 100% to the charging rate of 0%, and is written in the specification prepared by the manufacturer. The battery manager 4 estimates the consumption of electric power on the basis of the pieces of duration data u1, u2, u3, . . . and u32, and determines the pieces of critical data CL and CH on the basis of the pieces of duration data u1, u2, u3, . . . and u32. The pieces of duration data u1 to u32 express user's tendency, i.e., how frequency the user repeats the charging-and-discharging cycle so that the battery manager 4 can determines appropriate a charge initiation level L and a charge completion level H on the basis of the pieces of duration data u1 to u32. The charge initiation level L is a threshold at which the charging circuit 2a starts to charge the rechargeable battery 1a, and is expressed as a ratio of the amount of residual charge to the amount of electric charge at the charging rate of 100%. On the other hand, the charge completion level H is another threshold at which the charging circuit 2a stops the charging, and is also expressed as a ratio of the amount of residual charge to the amount of electric charge at the charging rate of 100%.

The charge initiation level L and charge completion level H are converted to the smallest amount of electric charge CL and largest amount of electric charge CH as will be hereinlater described in detail. The pieces of critical data CL and CH are written in the memory locations 30. The charge initiation level L and charge completion level H are expressed in percentage with respect to the maximum capacity of the rechargeable battery 1a, and the maximum capacity is indicated by the manufacturer in the specification of rechargeable battery 1a.

If the thirty-two pieces of duration data u1 to u32 have been stored in the memory locations 41, the next piece of duration data is written in the memory location where the oldest piece of duration data is stored. Thus, the thirty-two pieces of duration data are stored in the memory locations 41.

Computer Program

The functions of information processing system 2b are hereinafter described in more detail. The computer program, which runs on the microprocessor of the information processing system 2b, is broken down into a main routine program and subroutine programs. While the main routine program is running on the microprocessor, the microprocessor achieves predetermined jobs. One of the jobs in the main routine program is to increment plural timers. One of the timers is the software timer 40, and the software timer 40 is incremented on the condition that the status flag 31 is raised. Two timers are non-conditionally incremented for timer interruptions, and the main routine program branches to the subroutine programs through the timer interruptions. One of the subroutine programs is assigned to the charge controller 3, and another subroutine program is assigned to the battery manager 4.

Figure 3:
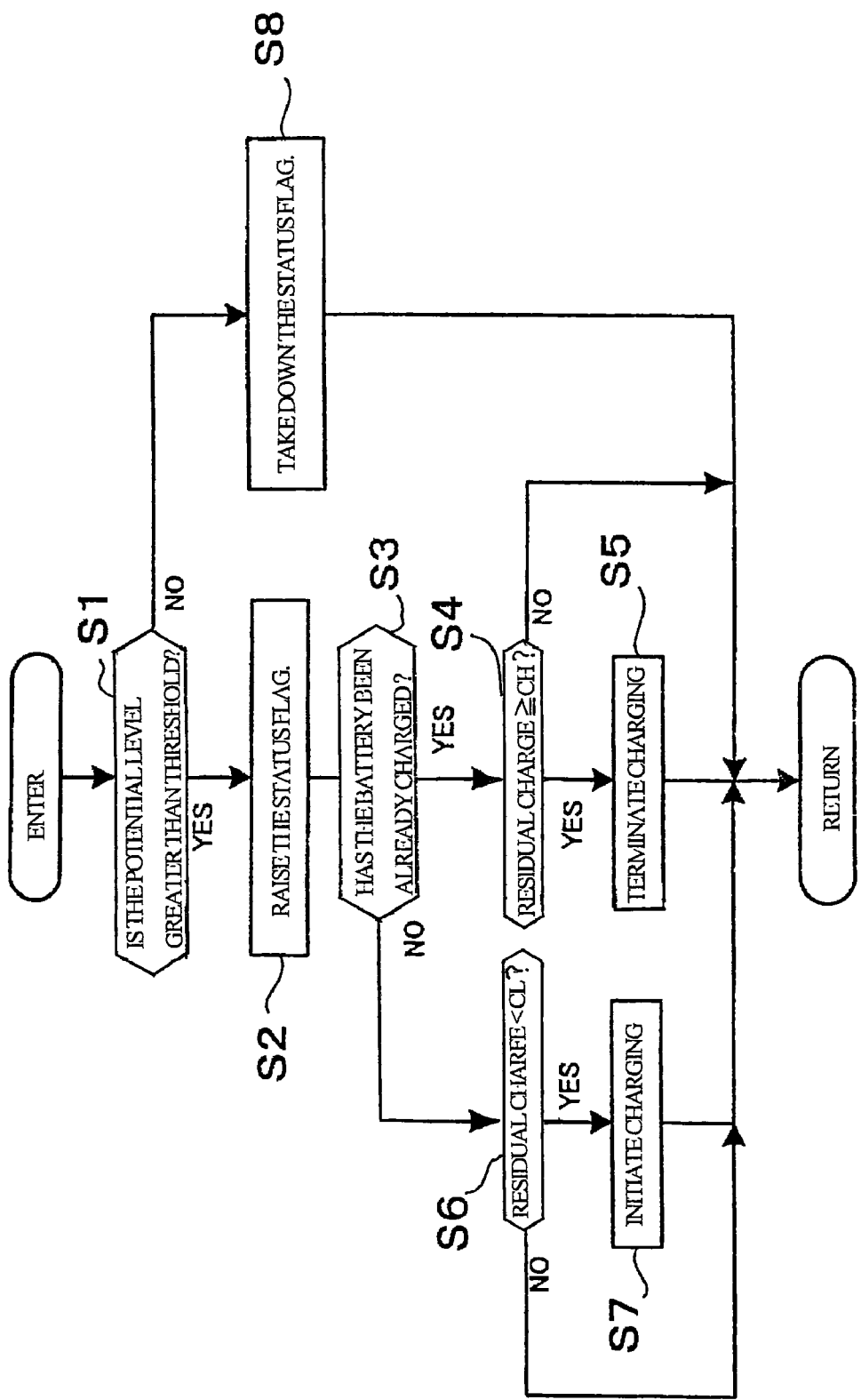
FIG. 3 is a flowchart showing a sequence of jobs achieved through a subroutine program for a charge controller.

FIG. 3 shows a job sequence in the subroutine program for the charge controller 3. The microprocessor periodically enters the subroutine program for the charge controller 3, and realizes the function of charge controller 3 as follows.

When the microprocessor enters the subroutine program for the charge controller 3, the microprocessor fetches the piece of potential data to see whether or not the charging circuit 2a is connected to the external power source 5 as by step S1. If the external power source 5 is disconnected from the charging circuit 2a, the piece of potential data expresses zero, i.e., the potential level not greater than the predetermined threshold, and the answer at step S1 is given negative "No". Then, the microprocessor takes down the status flag 31, or keeps the status flag down 31 as by step S8. After the execution at step S8, the microprocessor returns to the main routine program.

If, on the other hand, the external power source 5 is connected to the charging circuit 2a, the piece of potential data expresses a positive value greater than the threshold, and the answer at step S1 is given affirmative "Yes". Then, the microprocessor raises the status flag 31 or keeps the status flag 31 down as by step S2.

Subsequently, the microprocessor checks the status flag 31 to see whether or not the charging has been already carried out as by step S3. If the microprocessor keeps the status flag 31 raised at step S2 immediately before present step S3, the answer at step S3 is given affirmative "Yes". On the other hand, the microprocessor raises the status flag 31 at step S2, the charging circuit 2a merely gets ready to charge the rechargeable battery 1a, and the answer at step S3 is given negative "No".

With the positive answer at step S3, the microprocessor reads out the piece of critical data CH, and compares the residual charge with the largest amount of electric charge CH to see whether or not the amount of residual charge is equal to or greater than the largest amount of electric charge as by step S4. If the amount of residual charge has not reached the largest amount of electric charge CH, the answer at step S4 is given negative "No", and the microprocessor returns to the main routine program.

When the answer at step S4 is given affirmative "Yes", the rechargeable battery 1a has the electric charge much enough to sustain the usage of mobile telephone 10 in so far as the user keeps the charging-and-discharging cycle. For this reason, the microprocessor supplies the control signal CTL1 representative of termination of charging to the charging circuit 2a. The charging circuit 2a is responsive to the control signal CTL1, and terminates the charging at step S5. After the supply of control signal CTL1 to the charging circuit 2a, the microprocessor returns to the main routine program.

If the answer at step S3 is given negative "No", the microprocessor reads out the piece of critical data CL, and compares the amount of residual charge with the smallest amount of electric charge CL to see whether or not the amount of residual charge is less than the small amount of electric charge CL as by step S6.

When the microprocessor finds the residual charge to be more than the smallest amount of electric charge CL, the answer at step S6 is given negative "No", and the microprocessor returns to the main routine program so as to continue the charging. If, on the other hand, the amount of residual charge is less than the smallest amount of electric charge CL, the answer at step S6 is given affirmative "Yes". Then, the microprocessor supplies the control signal CTL1 representative of the initiation of charging at step S7. The charging circuit 2a is responsive to the control signal CTL1 so as to start to charge the rechargeable battery 1a. After the supply of control signal CTL1 to the charging circuit 2a, the microprocessor returns to the main routine program.

Thus, the microprocessor reiterates the loop consisting of steps S1 to S8 so as to keep the rechargeable battery 1a between the smallest amount of electric charge CL and the largest amount of electric charge CH.

Figure 4:
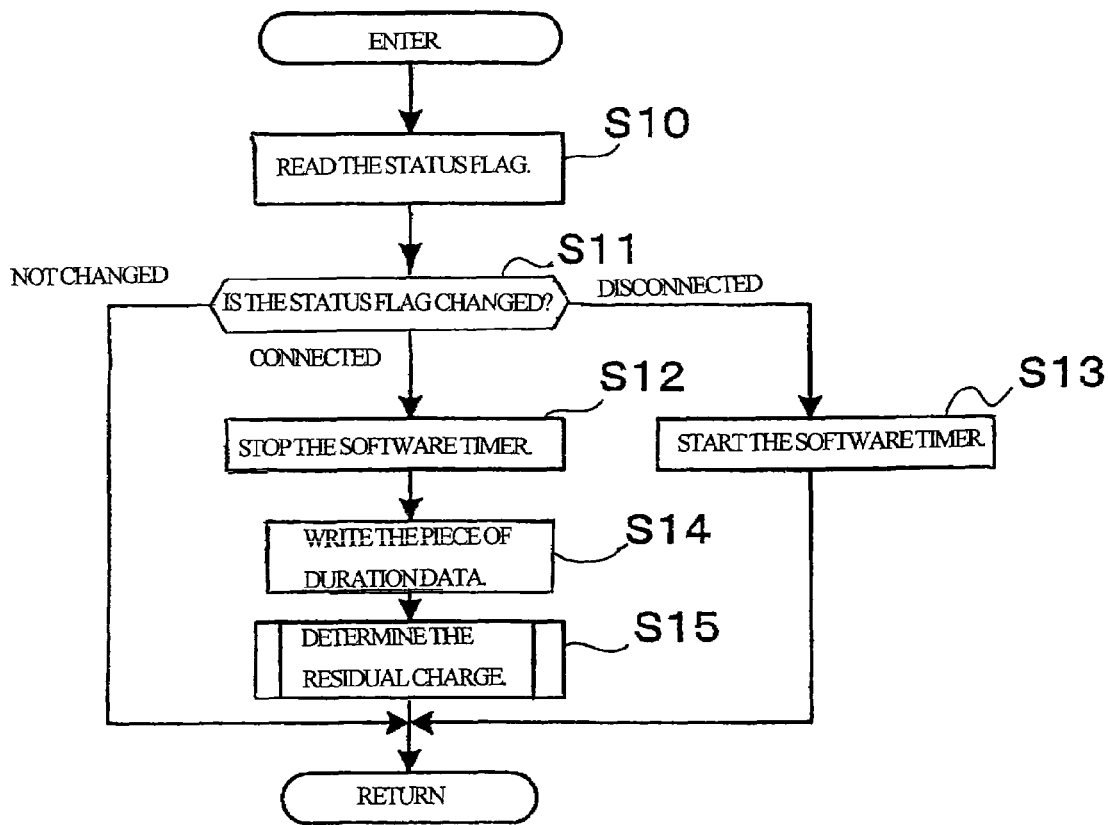
FIG. 4 is a flowchart showing a sequence of jobs achieved through a subroutine program for a battery manager.
Figure 5:
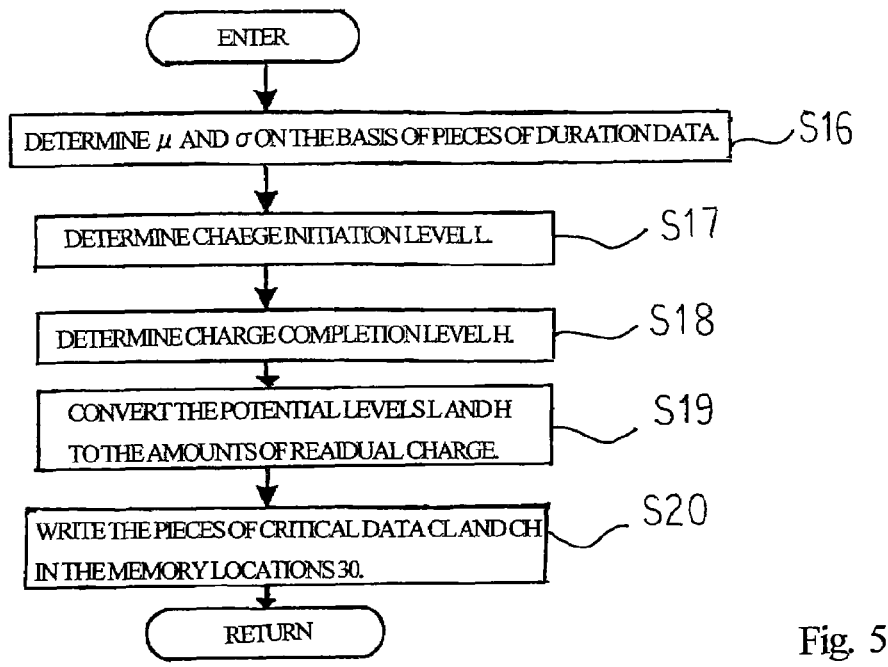
FIG. 5 is a flowchart showing a sequence of jobs at a step of the subroutine program for a battery manager.

Subsequently, description is made on the battery manager 4 with reference to FIGS. 4 and 5. The main routine program periodically branches the subroutine program for the battery manager 4 through the timer interruption, and the timer interruption takes place at time intervals of 5 seconds. The battery manager 4 measures the lapse of time consumed in discharging, and determines the smallest amount of electric charge CL and the largest amount of electric charge CH as follows.

First, the microprocessor reads out the status flag 31 from the working memory as by step S10, and checks the status flag 31 to see whether or not the current status between the external power source 5 and the charging circuit 2a is changed from the previous execution through the timer interruption as by step S11. If the charging circuit 2a is disconnected from the external power source 5 after the previous execution, the current status is changed from the connected state to the disconnected state, and the answer at step S11 is given as "DISCONNECTED". Then, the microprocessor starts the software timer 40 so as to measure the lapse of time consumed in discharging as by step S13. After the job at step S13, the microprocessor returns to the main routine program.

If the current status is same as that in the previous execution, i.e., "NOT CHANGED", the microprocessor immediately returns to the main routine program. If the software timer 40 has already started, the lapse of time is continuously measured. If, on the other hand, the software timer 40 stands idle, the software timer 40 is not incremented.

If the current status is changed from the disconnected state to the connected state, the electric charge is not consumed any more, and the answer is given as "CONNECTED". Then, the microprocessor stops the software timer 40 as by step S12, and proceeds to step S14. The lapse of time, i.e., the discharging time period is left in the software timer 40.

The microprocessor transfers the piece of duration data expressing the lapse of time, which is measured by the software timer 40, to the working memory, and stores the piece of duration data in the memory location 41.

Upon completion of job at step S14, the microprocessor determines the smallest amount of electric charge CL and largest amount of electric charge CH as by step S15. The jobs at step S15 is illustrated in FIG. 5 in more detail.

The thirty-two pieces of duration data u1 to u31 are assumed to have been already stored in the memory locations 41. The microprocessor firstly calculates the mean value $\mu$ of the lapse of time and the standard deviation $\sigma$ as by step S16. In detail, the microprocessor converts thirty-two values u1, u2, u3, . . . and u32 of the lapse of time to corresponding values ln(u1), ln(u2), ln(u3), . . . and ln(u32) of the naturalized logarithm, and determines the mean $\mu$ of the values ln(u1), ln(u2), ln(u3), . . . and ln(u32). The microprocessor calculates the standard deviation $\sigma$ on the basis of the values ln(u1), ln(u2), ln(u3), . . . and ln(u32) and the mean value $\mu$.

Subsequently, the microprocessor determines the charge initiation level L on the basis of the mean value $\mu$ and standard deviation $\sigma$. In this instance, the charge initiation level L is determined as follows.

The lapse of time is assumed to be fallen within the logarithmic normal distribution. The provability, at which each lapse of time is fallen within the range [$\mu$+2$\sigma$], is 95.44% from the property of the normal distribution. The range [$\mu$+2$\sigma$] is expressed in exponential function as exp($\mu$+2$\sigma$). It is possible to presume that most of the lapse of time, i.e., 95.44%, is found in the time period equivalent to exp($\mu$+2$\sigma$). If the time period equivalent to exp($\mu$+2$\sigma$) is ensured to the rechargeable battery 1a, the shortage of electric power does not occur from the viewpoint of statistics. The time period equivalent to exp($\mu$+2$\sigma$) is hereinafter referred to as "minimum ensured operating time period".

As hereinbefore described, the values u1, u2, u3, . . . and u32 of lapse of time are expressed as the ratio to the maximum operating time period so that the minimum ensured operating time period is also expressed as the ratio to the maximum operating time period. Exp($\mu$+2$\sigma$) is equivalent to a ratio of residual charge, which is corresponding to the minimum ensured operating time period, to the maximum capacity at the charging rate of 100%. For this reason, if the residual charge corresponding to exp($\mu$+2$\sigma$) is left in the rechargeable battery 1a, it is possible continuously to use the rechargeable battery 1a for the minimum ensured operating time period. In other words, if the charge initiation level L is equal to exp($\mu$+2$\sigma$), the rechargeable battery 1a can supply the electric charge to the radio communication system 1c regardless of the amount of residual charge at the disconnection from the external power source 5. For this reason, the charge initiation level L is given as $$L=\exp(\mu+2\sigma) \quad \text{equation 1}$$

Variable $\mu'$ is substituted for exp($\mu$), and variable $\sigma'$ is substituted for exp(2$\sigma$). Then, equation 1 is rewritten as $$L=\mu'\times\sigma' \quad \text{equation 1'}$$

In this instance, the minimum threshold Lmin is predetermined for the battery manager 4. The minimum threshold Lmin is the critical value of the charge initiation level L. If the calculation result of equation 1', i.e., the charge initiation level L is less than the minimum threshold Lmin, the battery manager 4 employs the minimum threshold Lmin as the charge initiation level L. If the charge initiation level L has an extremely small value, users tend to mis-interpret the long time period from the previous recharging as a trouble in external power source 5, charging circuit 2a or rechargeable battery 1a. the minimum threshold Lmin is desirable for users. From this point of view, the minimum threshold Lmin has a value equivalent to the charging rate of 50%, by way of example.

In short, the microprocessor determines the charge initiation level L through equation 1', i.e., $\mu'*\sigma'$ on the condition that the calculated value is fallen within the range of [1.0≧L≧Lmin] at step S17. The charge initiation level L is given as the calculation result of equation 1' in so far as the calculation result is greater than the minimum threshold Lmin. On the other hand, if the calculation result is equal to or less than Lmin, the battery manager 4 employs the minimum threshold Lmin as the charge initiation level L.

Figure 6:
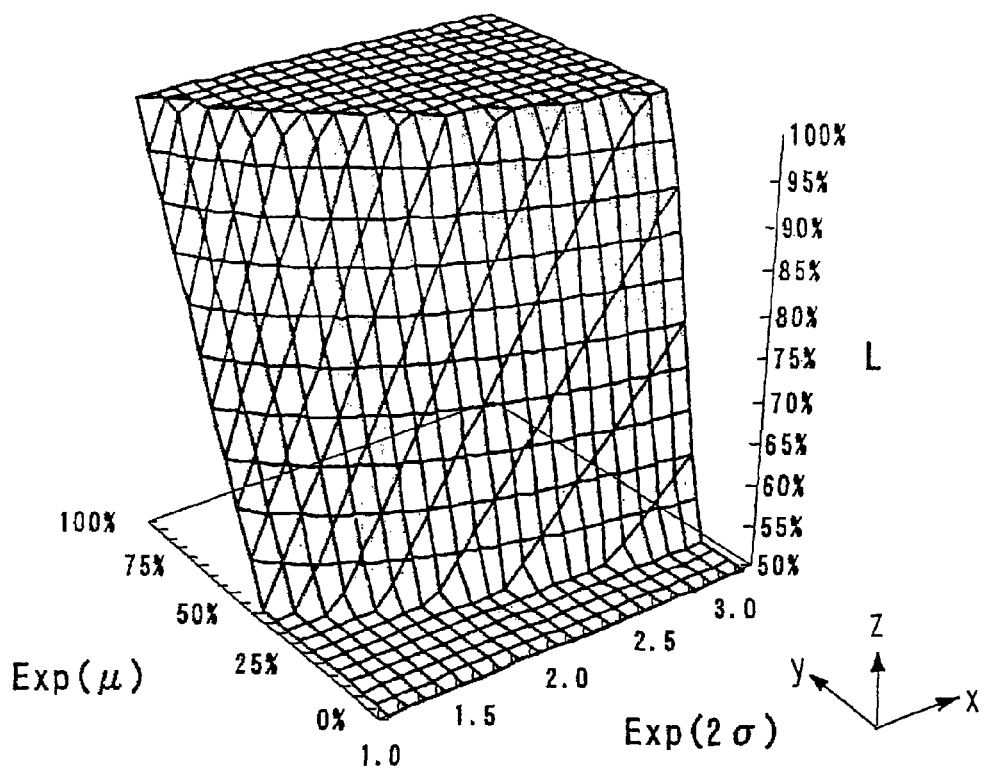
FIG. 6 is a graph showing relation among a mean value, a standard deviation and a charge initiation level.
Figure 7:
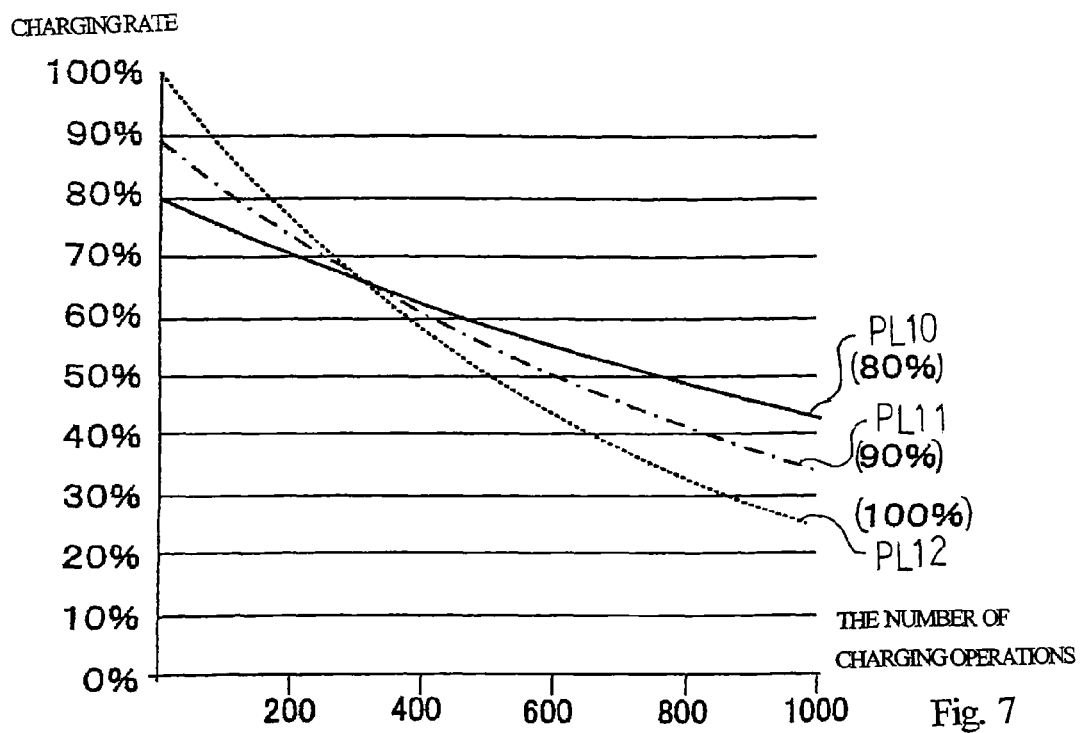
FIG. 7 is a graph showing relation between the charging rate and the number of charging operations on a rechargeable battery.

FIG. 6 shows relation among the mean value exp($\mu$), i.e., $\mu'$, standard deviation exp(2$\sigma$), i.e., $\sigma'$ and the charge initiation level L. X-axis stands for the mean value $\mu'$, y-axis is indicative of the standard deviation $\sigma'$, and z-axis stands for the charge initiation level L. The minimum threshold Lmin is equal to the charge rate of 50%, and, for this reason, the charge initiation level L is increased from 50%. Thus, the charge initiation level L is determinable on the basis of the mean value $\mu'$ and the standard deviation $\sigma'$.

As will be understood from the job at step S 17, the rechargeable battery 1a always keeps the electric charge for the radio communication system 1c continuously operating over the minimum ensured operating time period so that the shortage of electric power does not take place from the viewpoint of statistics. Moreover, since the battery manager 4 takes the actual usage of mobile telephone 10 into account for the charge initiation level L, the frequency of charging operation is reduced under the condition that the user frequency picks up the movable telephone 10 for short time.

A rate of permissible discharges C per a single charging operation is expressed as $$C=(H-L)/\mu'+1 \quad \text{Equation 2}$$

where L is the charge initiation level, H is the charge completion level and $\mu'$ is the mean value. From equation 2, it is understood that the larger the difference L and H is, the more the rate of permissible discharges C is. In other words, the rate of permissible discharges C is increased together with the difference between the charge initiation level L and the charge completion level H. For this reason, the frequency of charging operations is reduced under the condition that the charge completion level H is widely spaced from the charge initiation level L. Thus, it is desirable to make the difference between the charge initiation level L and the charge completion level H as large as possible.

Turning back to FIG. 5 of the drawings, the microprocessor proceeds to step S18 upon completion of the job at step S17 where the microprocessor determines the charge completion level H on the basis of the charge initiation level L. As described hereinbefore, the charge completion level H is expressed as the ratio of residual charge to the amount of electric charge at the charging rate of 100%.

The charge completion level H is to have a value, which prevents the rechargeable battery $1a$ from overcharge, and which makes the number of charging operations as many as possible. In order to satisfy the above-described technical goals, the value of charge completion level H is to be less than the charge rate of 100%. When the charge completion level H is fixed to 80%, the relation is expressed by plots PL10. However, if the charge completion level H is increased to 90% and further to 100%, plots PL11 and PL12 stand for the relation. From each of the plots PL10, PL11, PL12, it is understood that the charging rate is reduced when the number of charging operations is increased. Moreover, the plots PL10, PL11 and PL12 indicate that the lower the charge completion level H is, the more the number of charging operations. For example, in case where the charge completion level is fixed to 100%, the maximum charge rate is reduced to 50% at repetition of 500 times. However, when the charge completion level is fixed to 80%, the maximum charge rate is reduced to 50% at relation of 750 times. Thus, the life time at the charge completion level of 80% is increased to 1.5 times of the life time at the charge completion level of 100%. The present inventor found that coefficient K of the increased life time is expressed as $$K=-2.5 \times H+3.5 \quad \text{Equation 3}$$

When the charge completion level H is fixed to a large value, the life time is prolonged.

From equations 2 and 3, a rate of permissible discharges in life time T is defined as $$T=CK=\{(H-L)/\mu'+1\}\times(-2.5\times H+3.5) \quad \text{Equation 4}$$

The rate of permissible discharges in life time T is varied together with the charge initiation level L and charge completion level H. In detail, when the charge initiation level L and charge completion level H are equal to 100% of the charge rate, the number of permissible discharges in life time is equal to a value guaranteed by the manufacture of the rechargeable battery $1a$. The number of permissible discharges in life time is written in the specification of rechargeable battery $1a$. When the charge initiation level L and charge completion level H are set to 100% of the charge rate, the rate of permissible discharges is equal to 1.0. If the charge initiation level L and charge completion level H are set to certain values different from 100%, the rate of permissible discharges in life time is varied from 1.0. A larger value of the rate of permissible discharges in life time T makes the life time prolonged.

In this situation, the charge completion level H is determined by using equation 4. In detail, the charge initiation level L is determined at step S17. The charge completion level H has three candidates H1, H2 and H3, and one of the candidates H1, H2 and H3 is employed for the rate of permissible discharges T in life time. One of the candidates H1, H2 and H3, which makes the largest value of the ratio of permissible discharges T in life time long, is employed depending upon the charge initiation level L. If the charge initiation level H is too small in value, it is not effective against the overcharge. From the viewpoint of protection against the overcharge, the lowest limit of charge completion level H is predetermined. In this instance, the lowest limit is charge rate of 70%. However, the charge rate of 70% does not set any limit to the technical scope of the present invention. The lowest limit is to be determined for the employed model of rechargeable battery $1a$.

(1) Candidate H1 is determined as follows. The value of ($\mu' \times \sigma'$) is substituted for L in equation 4. Then, equation 4 is rewritten as $$T=(H/\mu'-\sigma'+1)\times(-2.5\times H+3.5)$$

The above equation is differentiated as $$dT/dH=1/\mu'\times\{-5\times H+2.5\times\mu'\times(\sigma'-1)+3.5\}$$

0 is substituted for dT/dH, and the maximum value is determined.

$$1/\mu'\times\{-5\times H+2.5\times\mu'\times(\sigma'-1)+3.5\}=0$$

When the charge initiation level L is ($\mu'\times\sigma'$), the rate of permissible discharges in life time T is maximized at the following candidate H1.

$$H1=0.5\times\mu'\times(\sigma'-1)+0.7$$

When the charge initiation level L, which is determined as step S17, is equal to or greater than the minimum threshold Lmin, the candidate H1 is employed as the charge completion level H.

(2) The candidate H2 is determined as follows.

The minimum threshold Lmin is substituted for the charge initiation level L in equation 4.

$$T=CK=\{(H-L\text{min})/\mu'+1\}\times(-2.5\times H+3.5)$$

The above equation is differentiated as $$dT/dH=1/\mu'\times\{-5\times H+2.5\times(L\text{min}-\mu')+3.5\}$$

0 is substituted for dT/dH, and the maximum value is determined.

$$1/\mu'\times\{-5\times H+2.5\times(L\text{min}-\mu')+3.5\}=0$$

When the charge initiation level L is Lmin, the rate of permissible discharges in life time T is maximized at the following candidate H2.

$$H2=0.5(L\text{min}-\mu')+0.7$$

In case where the charge initiation level L is calculated to be equal to or less than Lmin at step S17, the candidate H2 is employed as the charge completion level H.

(3) The candidate H3 is determined as follows.

The charge completion level H is to be less than the charge initiation level L. However, it is desirable that the charge completion level H is as low as possible from the viewpoint of the coefficient K. If the candidate H1 or H2, which makes the rate of permissible discharges in life time longest, is equal to or less than the charge initiation level L, it is impossible to employ the candidate H1 or H2. Nevertheless, the candidates H1 and H2 are equal to or less than the charge initiation level L under the condition that the charge initiation level L has a large value. In fact, in case where the minimum ensured operating time is fairly long, the candidates H1 and H2 tend to have values equal to or less than the charge initiation level L. In this situation, there is little possibility to repeat the shallow discharge. For this reason, the candidate H3 is equal to the charge initiation level (μ'×σ').

Figure 8:
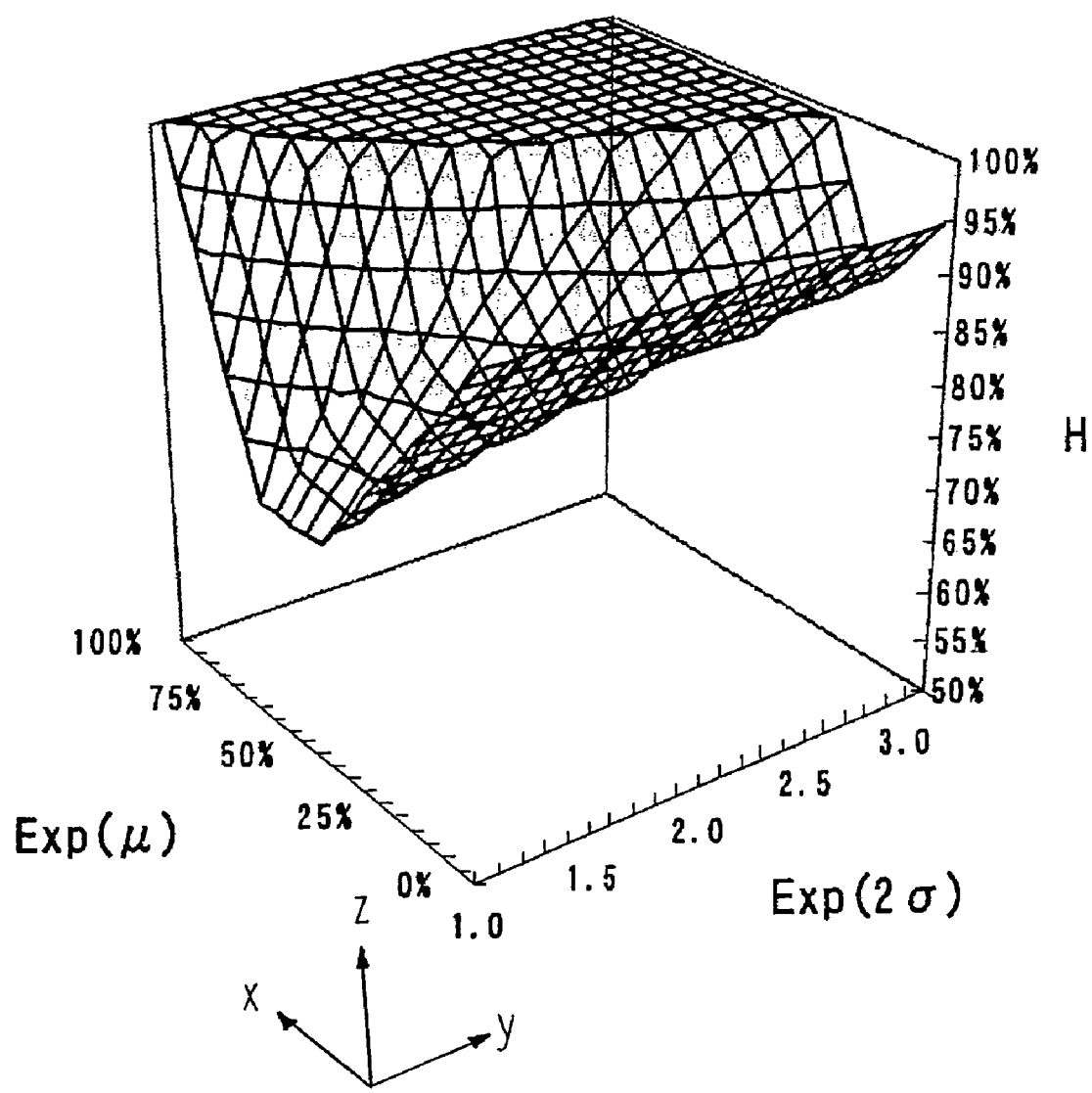
FIG. 8 is a graph showing relation among the mean value, standard deviation and a charge completion level.

Thus, the charge completion level H is selected from the candidates H1, H2 and H3 depending upon the value of charge initiation level L. FIG. 8 shows relation among the mean value μ', standard deviation σ' and the charge completion level H. X-axis is indicative of the mean value μ', y-axis stands for the standard deviation σ'. Z-axis is indicative of the charge completion level H determined as hereinbefore described. The lowest charge completion level H is the charge rate of 70% as described hereinbefore.

Upon completion of the job at step S18, the microprocessor converts the charge initiation level L and charge completion level H to the smallest amount of electric charge CL and largest amount of electric charge CH as by step S19, respectively, and writes the pieces of critical data expressing the smallest amount of electric charge CL and largest amount of electric charge CH in the memory locations as by step S20.

As will be understood from the foregoing description, the charge initiation level L and charge completion level H are individually determined for the electronic appliances. The charge initiation level L is determined on the basis of user's charge-and-discharging cycle, which is readable from the record of actual use, i.e., the pieces of duration data u1, u2, u3, . . . and u32, from the viewpoint of restriction on the number of charging operations without shortage of electric charge. The charge completion level H is determined on the basis of the charge initiation level L and, accordingly, user's charge-and-discharge cycle from the viewpoint of the restriction on the number of charging operations without the overcharge.

Second Embodiment

Figure 9:
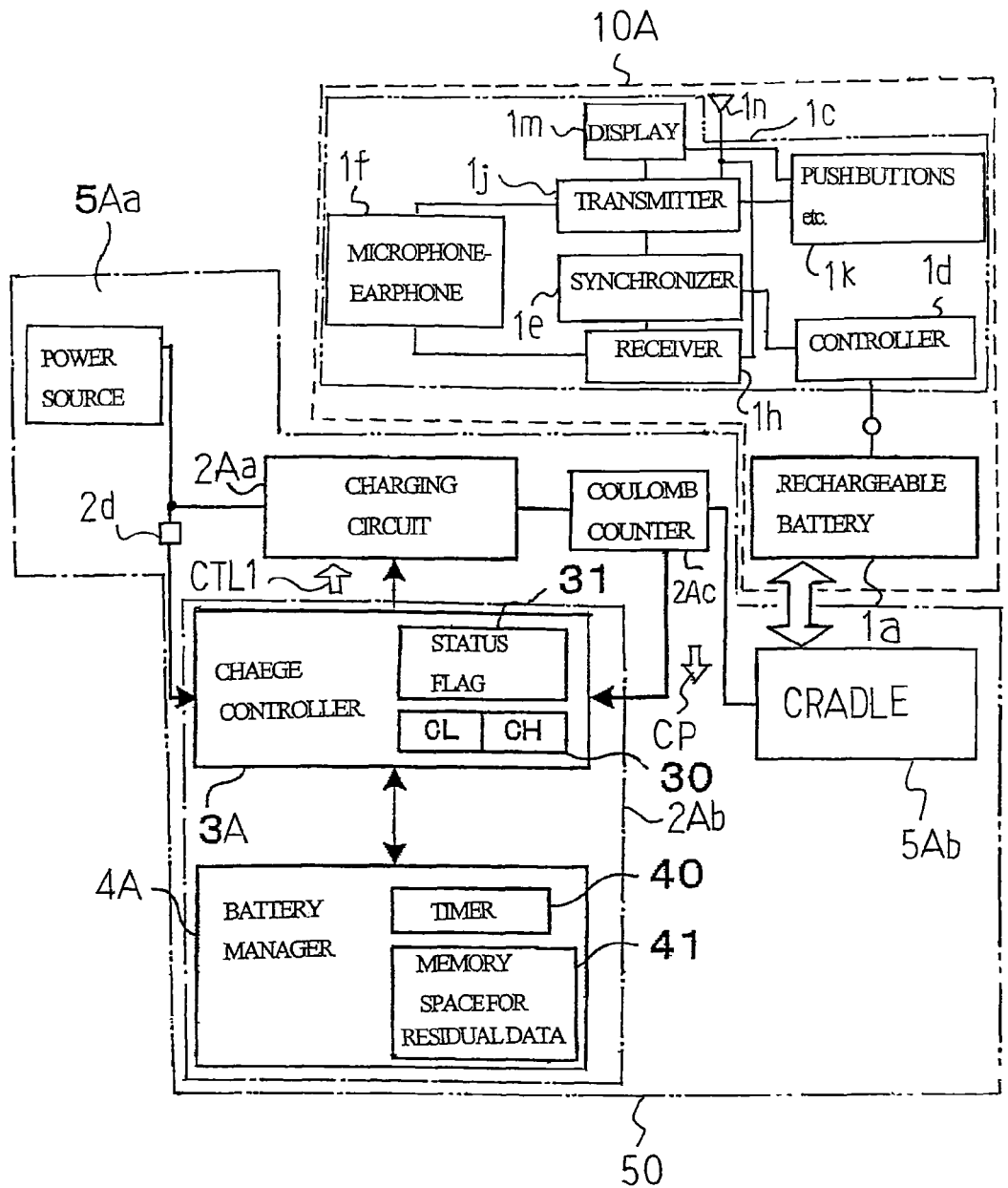
FIG. 9 is a block diagram showing the system configuration of a battery charger of the present invention.

Turning to FIG. 9 of the drawings, a battery charger 50 embodying the present invention is provided for an electronic appliance 10A. In this instance, the electronic appliance 10A is a mobile telephone. The mobile telephone 10A is similar in structure to the mobile telephone 10, and, for this reason, the system components of mobile telephone 10A are labeled with references designating corresponding system components of mobile telephone 10 without detailed description.

The battery charger 50 includes a charging circuit 2Aa, an information processing system 2Ab, a coulomb counter 2Ac, a power source 5Aa and a cradle 5Ab. The power source 5Aa contains an ac-to-dc converter, and the rechargeable battery 1a is put on the cradle 5Ab for charging. The charging circuit 2Aa, coulomb counter 2Ac and information processing system 2Ab are similar to the charging circuit 2a, coulomb counter 2c and information processing system 2b so that no further description is hereinafter incorporated for the sake of simplicity.

A computer program runs on the microprocessor of the information processing system 2Ab, and a charge controller 3A and a battery manager 4A are realized through execution of jobs in the computer program. The functions, which are expressed as the charge controller 3A and battery manager 4A, are same as those of the charge controller 3 and battery manager 4. No further description is hereinafter made on the computer program for avoiding repetition.

The battery charger 50 is conducive to reduction of the number of recharging operation on the rechargeable battery 1a as similar to the corresponding system components of the mobile telephone 10.

Third Embodiment

Figure 10:
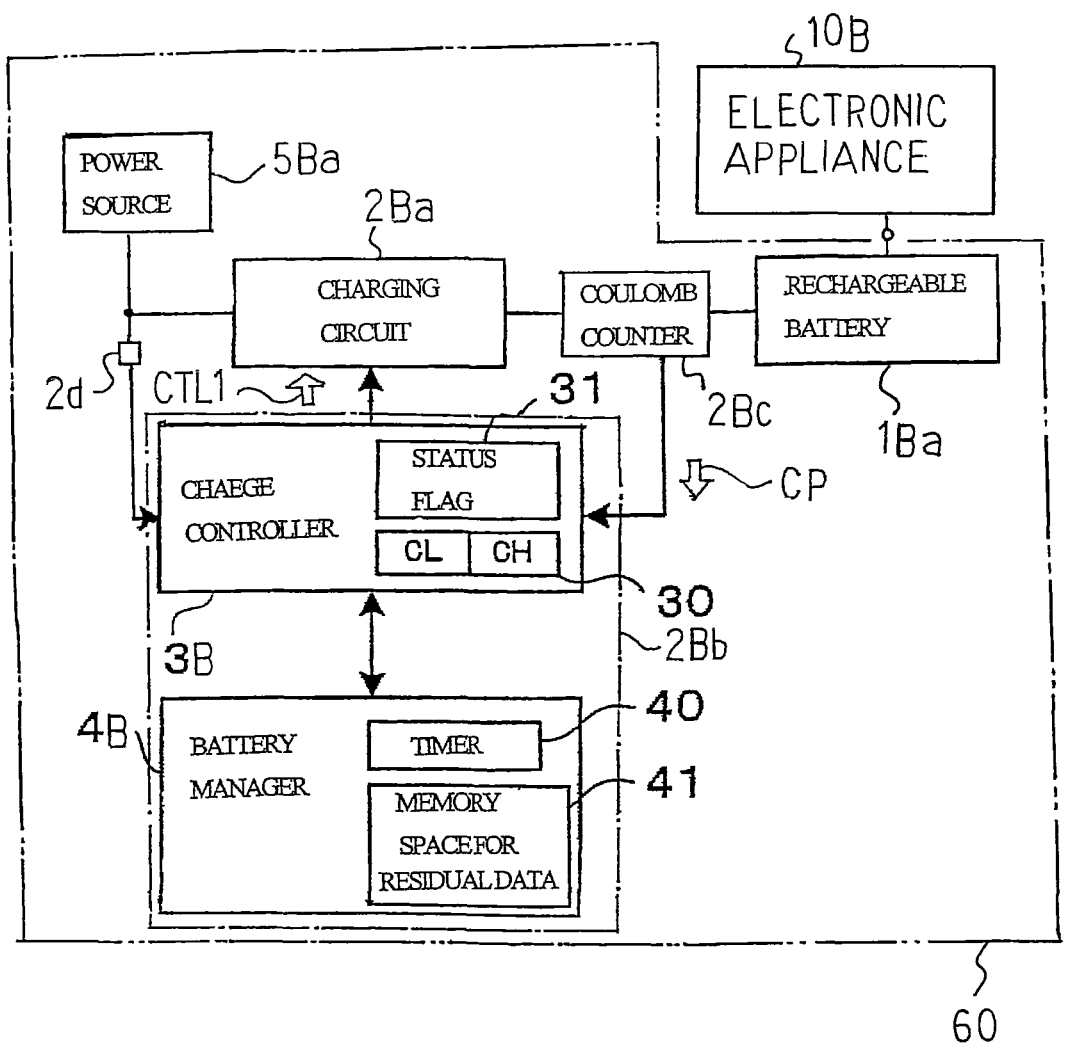
FIG. 10 is a block diagram showing the system configuration of a secondary battery unit of the present invention.

Turning to FIG. 10 of the drawings, a secondary battery unit 60 embodying the present invention is connected to and disconnected from an electronic appliance 10B. Electric power is supplied from the secondary battery unit 60 to the electronic appliance 10B.

The secondary battery unit 60 includes a rechargeable battery 1Ba, a charging circuit 2Ba, an information processing system 2Bb, a coulomb counter 2Bc and a power source 5Ba. The power source 5Ba supplies dc current to the charging circuit 2Ba, and the rechargeable battery 1Ba, charging circuit 2Ba, information processing system 2Bb and coulomb counter 2Bc are similar to the rechargeable battery 1a, charging circuit 2a, information processing system 2b and coulomb counter 2c, and, for this reason, no further description is hereinafter incorporated for the sake of simplicity.

A computer program runs on the microprocessor of the information processing system 2Bb, and a charge controller 3B and a battery manager 4B are realized through execution of jobs in the computer program. The functions, which are expressed as the charge controller 3B and battery manager 4B, are same as those of the charge controller 3 and battery manager 4. No further description is hereinafter made on the computer program for avoiding repetition.

The secondary battery unit 60 is conducive to reduction of the number of recharging operation on the rechargeable battery 1Ba as similar to the corresponding system components of the mobile telephone 10.

Although particular embodiments of the present invention have been shown and described, it will be apparent to those skilled in the art that various changes and modifications may be made without departing from the spirit and scope of the present invention.

The mobile telephone 10 and notebook-sized personal computer 10A do not set any limit to the technical scope of the present invention. The secondary cell unit of the present invention is applicable to any sorts of electronic appliances such as, for example, a PDA and an electric razor and an electric motor car.

The lithium-ion cells do not set any limit to the technical scope of the present invention. Nickel cadmium cells and nickel metal hydride cells are available for the rechargeable battery 1a.

The information processing system 2b may be shared with the radio communication system 1c.

In the first embodiment, both of the charge initiation level L and charge completion level H are determined on the basis of the charge-and-discharge cycle expressed in the pieces of duration data. This feature does not set any limit to the technical scope of the present invention. In another embodiment, although one of the charge initiation level L and charge completion level H is determined on the basis of the charge-and-discharge cycle, the other of the charge initiation level L and charge completion level H is determined in such a manner as to be spaced from the charge initiation level L by a predetermined value. Otherwise, the other of the charge initiation level L and charge completion level H may be fixed to a predetermined value.

The logarithmic normal distribution does not set any limit to the technical scope of the present invention. The pieces of duration data may be ruled in another sort of normal distribution.

The thirty-two pieces of duration data u1, u2, u3, . . . and u32 do not set any limit to the technical scope of the present invention. The thirty-two pieces of duration data may be decreased to another number in so far as the new number of pieces of duration data is reliable from the viewpoint of statistics.

The coulomb counter 2c does not set any limit to the technical scope of the present invention. The coulomb counter 2c may be replaced with a voltmeter. In this instance, the charging controller 3 estimates the residual charge on the basis of the potential level of the electric power output from the rechargeable battery 1a, and the charge initiation level L and charge completion level H express the potential level.

Pieces of charge data, which express a difference in the residual charge in the rechargeable battery 1a between the completion of charging operation and the initiation of next charging operation, may be stored in the memory locations 41. In other words, the pieces of duration data are replaceable with the pieces of charge data.

In the first embodiment, when the mobile telephone is disconnected from the external power source 5, the software timer starts to measure the time period for the piece of duration data. This feature does not set any limit to the technical scope of the present invention. Although the charge-and-discharging cycle is less accurate, each piece of duration data may be produced from every $n^{th}$ use. Otherwise, the battery manager 4 may skip the measurement for every $n^{th}$ use. In this instance, predetermined lapse of time may be supplemented for the skipped use.

If the discharging is continued for an extremely long time period, such a long-term consumption is exceptional. In this situation, the long term may be replaced with a predetermined time period. Similarly, extremely short term use is exceptional, and the short term may be replaced with another predetermined time period.

The mean value μ, standard deviation σ and/or charge initiation level L may be determined through another method in so far as it or they are calculated on the basis of the pieces of measured data expressing the tendency of use such as the pieces of duration data.

The above-described control on the rechargeable battery 1a may be optional. In this instance, the electronic appliance has a charge restriction mode and a noninterference mode, and lets a user select one of the modes. When the user selects the charge restriction mode, the charge controller 3 and battery manager 4 control the charging operation as described hereinbefore. However, if the user selects the noninterference mode, the charge controller 3 and battery manager 4 stand idle.

The external power source 5a may have power generation capability. In this instance, the dc current is directly supplied from the external power source 5a to the charging circuit 2a.

The system components and jobs in the embodiments are correlated with claim languages as follows. Each of the rechargeable batteries 1a and 1Ba serves as a "rechargeable battery". While the amount of electric charge is being fallen within the range between the smallest amount of charge CL and the largest amount of charge CH, the rechargeable battery 1a, 1Aa or 1Ba is found in "state". The pieces of duration data u1, u2, u3, . . . and u32 are corresponding to "pieces of historical data".

The voltmeter 2d, information processing system 2b, 2Ab or 2Bb and jobs at steps S10, S11, S12 and S13 are corresponding to a "data collector", and the information processing system 2b, 2Ab or 2Bb and jobs at steps S16 to S20 serve as an "analyzer". The power source 5a, 5Aa or 5Ba, cradle 5b, 5Ab and charging circuit 2a, 2Aa or 2Ba as a whole constitute a "charging unit". The information processing system 2b, 2Ab or 2Bb and jobs at steps S1, S2, S3, S4 and S6 are corresponding to a "determiner", and the information processing system 2b, 2Ab or 2Bb and jobs at steps S5 and S7 serve as a "commander".

Each of the mobile telephone 10 and electronic appliance 10B serves as an "electric apparatus", and the radio communication system 1c is corresponding to an "electric system".

The power source 5a, 5Aa or 5Ba may be deleted from the "charging unit" of the battery charger, the charging unit of a secondary battery unit or the "charging unit" of the electric apparatus.

The charge initiation level L expresses a "condition to start the charging operation". The charge completion level H is also referred to as a "condition to complete the charging operation".

What is claimed is:

1. A battery charger for a rechargeable battery, comprising:
   a battery managing unit including
      a data collector monitoring said rechargeable battery to see whether or not said rechargeable battery is discharged and producing pieces of historical data expressing use of said rechargeable battery, and
      an analyzer connected to said data collector and determining a tendency of said use on the basis of said pieces of historical data so as preliminarily to determine state of said rechargeable battery to be charged;
   a charging unit electrically connectable to said rechargeable battery and charging said rechargeable battery; and
   a charge controlling unit including
      a determiner connected to said analyzer and said rechargeable battery and monitoring said rechargeable battery to see whether or not said rechargeable battery enters said state, and
      a commander connected to said determiner and said charging unit and instructing said charging unit to charge said rechargeable battery while said rechargeable battery is staying in said state.

2. The battery charger as set forth in claim 1, in which said analyzer calculates a condition to start the charging operation on said rechargeable battery on the basis of said pieces of historical data, and determines said state on the basis of said condition.

3. The battery charger as set forth in claim 2, in which said analyzer determines a distribution of said pieces of historical data so as to calculate said condition statistically preventing said rechargeable battery from unnecessary charging operation and shortage of electric charge.

4. The battery charger as set forth in claim 3, in which said condition is expressed as $$L=\mu' \times \sigma'$$

where L is said condition, $\mu'$ is $\exp(\mu)$, $\sigma'$ is $\exp(2\sigma)$, $\mu$ is a mean of values of said pieces of historical data and $\sigma$ is a standard deviation.

5. The battery charger as set forth in claim 1, in which said analyzer calculates a condition to complete the charging operation on said rechargeable battery on the basis of said pieces of historical data, and determines said state on the basis of said condition.

6. The battery charger as set forth in claim 5, in which said condition is given as a maximum value of the following differentiation $$dT/dH=d\{(H-L)/\mu'+1\}\{-2.5 \times H+3.5\}/dH=0$$

where T is a rate of permissible discharges in life time of said rechargeable battery, H is said condition, L is a value at which said charging operation starts, $\mu'$ is $\exp(\mu)$ and $\mu$ is a mean of values of said pieces of historical data.

7. The battery charger as set forth in claim 6, in which said L is expressed as $$L=\mu' \times \sigma'$$

where $\mu'$ is $\exp(\mu)$, $\sigma'$ is $\exp(2\sigma)$, $\mu$ is a mean of values of said pieces of historical data and $\sigma$ is a standard deviation.

8. The battery charger as set forth in claim 6, in which said H is expressed on the condition that said H is equal to or less than said L as $$\mu'\times\sigma'$$

where $\mu'$ is $\exp(\mu)$, $\sigma'$ is $\exp(\sigma)$, $\mu$ is a mean of values of said pieces of historical data and $\sigma$ is a standard deviation.

9. A secondary battery unit for supplying electric power to an apparatus, comprising:
a rechargeable battery connectable to said apparatus; and
a battery charger including
a battery managing unit having
a data collector monitoring said rechargeable battery to see whether or not said rechargeable battery is discharged and producing pieces of historical data expressing use of said rechargeable battery and
an analyzer connected to said data collector and determining a tendency of said use on the basis of said pieces of historical data so as preliminarily to determine state of said rechargeable battery to be charged,
a charging unit electrically connected to said rechargeable battery and charging said rechargeable battery, and
a charge controlling unit having
a determiner connected to said analyzer and said rechargeable battery and monitoring said rechargeable battery to see whether or not said rechargeable battery enters said state and
a commander connected to said determiner and said charging unit and instructing said charging unit to charge said rechargeable battery while said rechargeable battery is staying in said state.

10. The secondary battery unit as set forth in claim 9, in which said analyzer calculates a condition to start the charging operation on said rechargeable battery on the basis of said pieces of historical data, and determines said state on the basis of said condition.

11. The secondary battery unit as set forth in claim 10, in which said analyzer determines a distribution of said pieces of historical data so as to calculate said condition statistically preventing said rechargeable battery from unnecessary charging operation and shortage of electric charge.

12. The secondary battery unit as set forth in claim 11, in which said condition is expressed as $$L=\mu'\times\sigma'$$

where L is said condition, $\mu'$ is $\exp(\mu)$, $\sigma'$ is $\exp(2\sigma)$, $\mu$ is a mean of values of said pieces of historical data and $\sigma$ is a standard deviation.

13. The secondary battery unit as set forth in claim 9, in which said analyzer calculates a condition to complete the charging operation on said rechargeable battery on the basis of said pieces of historical data, and determines said state on the basis of said condition.

14. The secondary battery unit as set forth in claim 13, in which said condition is given as a maximum value of the following differentiation $$dT/dH = d\{(H-L)/\mu'+1\}\{-2.5\times H+3.5\}/dH=0$$

where T is a rate of permissible discharges in life time of said rechargeable battery, H is said condition, L is a value at which said charging operation starts, $\mu'$ is $\exp(\mu)$ and $\mu$ is a mean of values of said pieces of historical data.

15. The secondary battery unit as set forth in claim 14, in which said L is expressed as $$L=\mu'\times\sigma'$$

where $\mu'$ is $\exp(\mu)$, $\sigma'$ is $\exp(2\sigma)$, $\mu$ is a mean of values of said pieces of historical data and $\sigma$ is a standard deviation.

16. The secondary battery unit as set forth in claim 14, in which said H is expressed on the condition that said H is equal to or less than said L as $$\mu'\times\sigma'$$

where $\mu'$ is $\exp(\mu)$, $\sigma'$ is $\exp(2\sigma)$, $\mu$ is a mean of values of said pieces of historical data and $\sigma$ is a standard deviation.

17. An electric apparatus carrying out a work, comprising:
an electric system accomplishing said work;
a rechargeable battery connected to said electric system; and
a battery charger including
a battery managing unit having
a data collector monitoring said rechargeable battery to see whether or not said rechargeable battery is discharged and producing pieces of historical data expressing use of said rechargeable battery and
an analyzer connected to said data collector and determining a tendency of said use on the basis of said pieces of historical data so as preliminarily to determine state of said rechargeable battery to be charged,
a charging unit electrically connected to said rechargeable battery and charging said rechargeable battery, and
a charge controlling unit having
a determiner connected to said analyzer and said rechargeable battery and monitoring said rechargeable battery to see whether or not said rechargeable battery enters said state and
a commander connected to said determiner and said charging unit and instructing said charging unit to charge said rechargeable battery while said rechargeable battery is staying in said state.

18. The electric apparatus as set forth in claim 17, in which said analyzer calculates a condition to start the charging operation on said rechargeable battery on the basis of said pieces of historical data, and determines said state on the basis of said condition.

19. The electric apparatus as set forth in claim 17, in which said analyzer calculates a condition to complete the charging operation on said rechargeable battery on the basis of said pieces of historical data, and determines said state on the basis of said condition.

20. The electric apparatus as set forth in claim 17, in which said analyzer calculates a condition to start the charging operation on said rechargeable battery and another condition to complete said charging operation on the basis of said pieces of historical data, and said state is defined between said condition and said another condition, wherein said condition and said another condition are expressed as $$L=\mu'\times\sigma'$$

where L is said condition, $\mu'$ is $\exp(\mu)$, $\sigma'$ is $\exp(2\sigma)$, $\mu$ is a mean of values of said pieces of historical data and $\sigma$ is a standard deviation, $$dT/dH = d\{(H-L)/\mu'+1\}\{-2.5\times H+3.5\}/dH=0$$

where T is a rate of permissible discharges in life time of said rechargeable battery, H is said condition, L is a value at which said charging operation starts, $\mu'$ is $\exp(2\mu)$ and $\mu$ is a mean of values of said pieces of historical data.

* * * * *